E. G. BURESCH.
ELECTRICAL TESTING INSTRUMENT.
APPLICATION FILED MAY 19, 1919.

1,363,491.

Patented Dec. 28, 1920.
2 SHEETS—SHEET 1.

Inventor
Edward G. Buresch
Benjamin, Roadhouse & Lundy
Atty.

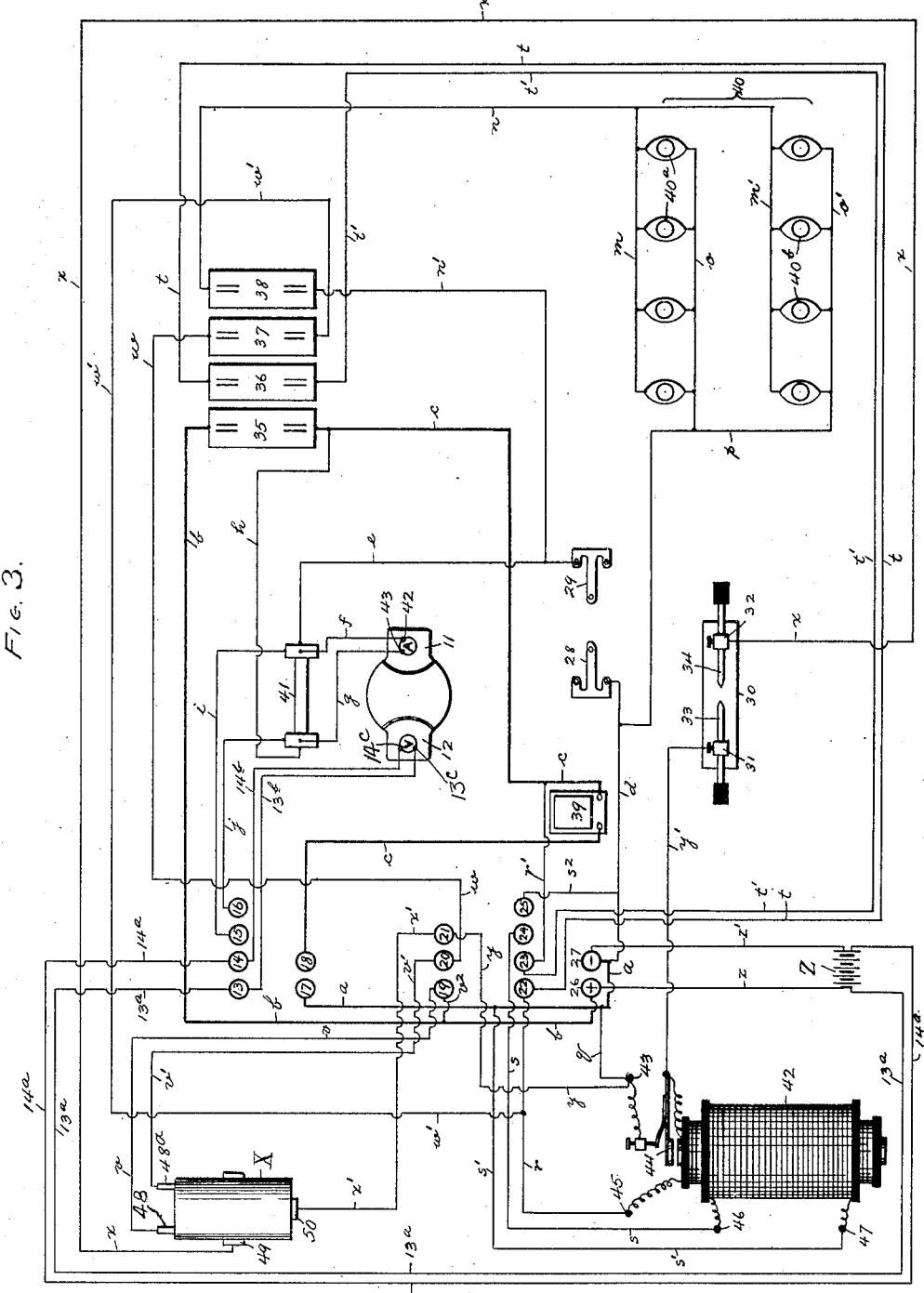

UNITED STATES PATENT OFFICE.

EDWARD G. BURESCH, OF CHICAGO, ILLINOIS, ASSIGNOR OF ONE-HALF TO OTTO J. BURESCH AND ONE-HALF TO CHARLES A. BITZA, BOTH OF CHICAGO, ILLINOIS.

ELECTRICAL TESTING INSTRUMENT.

1,363,491.          Specification of Letters Patent.     Patented Dec. 28, 1920.

Application filed May 19, 1919. Serial No. 298,173.

*To all whom it may concern:*

Be it known that I, EDWARD G. BURESCH, a citizen of the United States, residing at Chicago, in the county of Cook and State of Illinois, have invented new and useful Improvements in Electrical Testing Instruments, of which the following is a full, clear, and exact specification.

My present invention relates to improvements in an electrical testing instrument, and has special reference to the provision and arrangement of facilities for testing the various electrical elements which are embodied in and constitute the electrical equipment of automobiles. Electricity is now generally employed in automobiles for lighting and starting, as well as ignition, and to provide for this additional service a storage battery and a generator are generally installed. All the elements employed in connection with these divers uses are liable to get out of order and the several elements are not generally made by the same manufacturer so that when anything in connection with the electrical equipment of an automobile gets out of order it is very often a difficult matter, involving a visit to the several different specialists in the various parts even to find out what the trouble is.

One main object of my invention is to provide in a handy and economical form a single article in which shall be associated the various instrumentalities for making the divers requisite tests. Another object of my invention is not only to provide facilities for finding out whether the various elements of an electrical system are working, but also to ascertain whether these elements are working as efficiently as they are designed to and should be working. In attaining this latter object, I have provided a system of circuits to which, or in which the suspected element can be connected or inserted and which will provide practically ideal conditions for its operation instead of being compelled to test the element in the circuit in which the difficulty arose and which circuit may have a number of unsuspected imperfections which would embarrass the test.

Still other and further objects of my invention are to simplify the testing equipment for the respective tests both for the purpose of effecting an economy in manufacture and a still greater economy in time in connection with the use of the article.

I attain the foregoing objects by means of the structure and arrangement of the parts illustrated in the accompanying drawings, in which—

Figure 1:
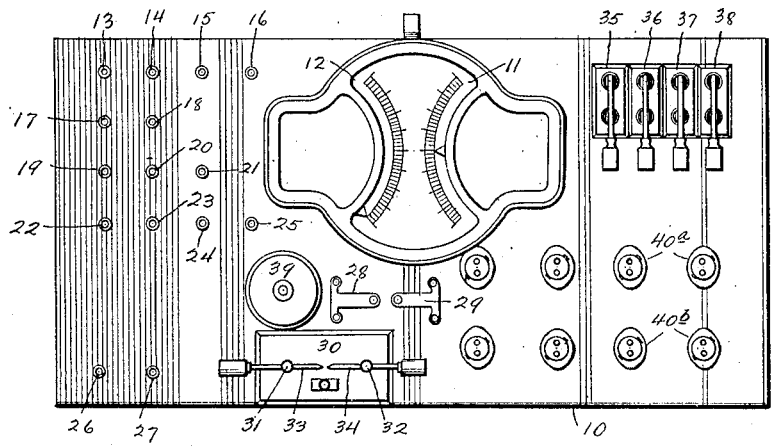
Figure 2:
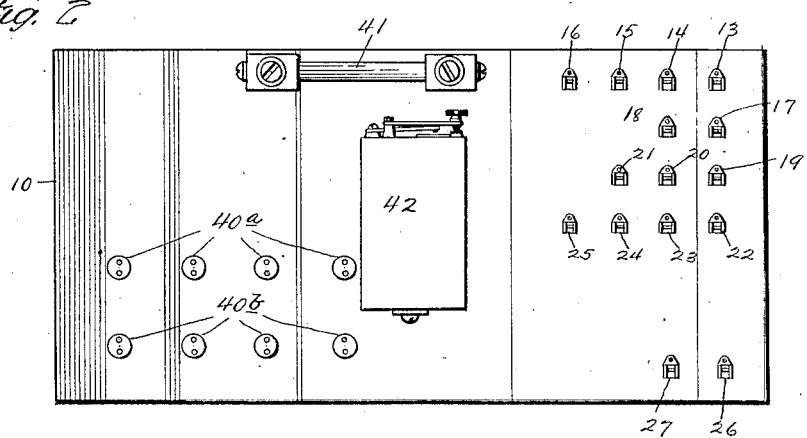

Figure 1 is a front elevation of an instrument board provided with the test devices and the means for making the necessary electrical connections for performing the tests, Fig. 2 is a rear elevation of the structure shown in Fig. 1; and, Fig. 3 is a schematic view of the combination and arrangement of electric circuits employed.

I have employed the same reference characters for designating the same parts in the respective views. In carrying out my invention, I have provided an instrument-board 10, in the upper central portion whereof is mounted a combined ampere-meter 11 and voltmeter 12. To the left of this instrument and extending from the top to the bottom of the board, I have provided five horizontal rows of sockets from which leads can conveniently be taken for making the divers tests hereinafter described.

There are four sockets in the first row which are numbered, respectively, 13, 14, 15 and 16. From sockets numbered 13 and 14 leads $13^a$ and $14^a$ are taken to the positive and negative poles of a battery for the purpose of ascertaining the voltage of the battery, and thereby obtaining a knowledge of the condition and efficiency thereof. The sockets 13 and 14 are connected by conductors $13^b$ and $14^b$ installed upon the board and leading, respectively, to the poles $13^c$ and $14^c$ of the voltmeter 12. From the second two sockets 15 and 16 of the first row leads are taken to any circuit for the purpose of measuring the amperage thereof. From the two sockets 17 and 18 in the second row leads are taken for the purpose of making low potential current tests for either shorts, imperfect insulation, or broken wires; the third row of three sockets 19, 20 and 21 are employed for making connections for leads to the low potential ends of the primary circuits of a coil to be tested, and to one of the high potential connections of the same coil in order to ascertain if the spark delivered by this coil is up to its listed rating or efficiency. The fourth row of sockets 22, 23, 24 and 25 are employed for taking leads for the purpose of testing spark plugs and also for making tests with a high potential current for shorts in heavy insulation, such as the walls of battery cells and distributer cases. The bottom row comprises two sockets, numbered 26 and 27, respectively, which are employed for taking leads to a battery or other dependable source of electricity for operating the circuits installed upon the board.

Immediately below the combined voltmeter and ampere-meter are located contact plates 28 and 29, respectively, which are employed for measuring the capacity of fuses. Below contact plates 28 and 29 are mounted the base 30, posts 31 and 32 and the adjustable rods 33 and 34 by means of which equipment the sparking capacity and efficiency of an induction or vibrating coil may be tested, when it is desired to test these elements independently of the circuit in which they were originally installed.

Immediately to the right of the voltmeter and ampere-meter are located four switches, the first, number 35 whereof controls the main circuit which supplies electricity for the divers tests. The second switch, number 36, controls the primary circuit for the induction coil installed upon the back of the board by means of which spark plugs and spark producing equipment are tested. The third switch, number 37, controls the circuit employed in testing the efficiency of induction or vibrating coils, and the fourth switch, number 38, controls the circuit for measuring the amperage of lamps and for delivering a current of a known amperage. To the left of the plates 28 and 29 is a buzzer or enunciator 39, and under the switches 35 to 38 inclusive, are a group of lamp sockets 40.

In order to make the various tests independently of the system the elements of which are under investigation, I start by leading wires $z$ and $z'$ as directly as possible from the respective poles of a dependable source of current which may be the battery Z of the system under investigation, or any other battery or dependable source of current, to the main connection sockets 26 and 27.

For testing out any circuit or suspected portion of a circuit for imperfect insulation or for shorts or broken wires or other imperfections leads are taken from the sockets 17 and 18 to the suspected element. Sockets 27 and 17 are connected directly by the conductor $a$. Sockets 26 and 18 are connected through the buzzer 14 by means of the conductors $b$ and $c$ through the switch 35. When the suspected portion or element of the system under investigation is connected through suitable leads with sockets 17 and 18, the presence of a suspected short will be indicated by the operation of the buzzer 39, and a suspected broken wire will be equally indicated by a failure of the buzzer to operate. The conductors $b$ and $c$ join through the switch 35 which, as will be seen hereafter, controls all of the circuits from the battery sockets 26 and 27 to the divers instruments.

For the purpose of measuring the capacity or the amperage of the fuse used in connection with the lighting circuit, I provide the contact plates 28 and 29 spaced a suitable distance apart so that the usual form of fuse employed may conveniently be disposed between and in contact with them. The plate 28 is connected with the conductor $a$ through the branch conductor $d$, while the plate 29 is connected by the conductor $e$ with one end of a shunt-plate 41 and from there by means of a conductor $f$ to a pole 42 of the ammeter or ampere-meter 11, the other pole 43 of which connects by means of conductor $g$ through the opposite end of the shunt-plate 41 and through a conductor $h$ with conductor $c$ and thence through switch 35 and conductor $b$ to battery socket 26. It will now be seen that by closing the switch 35 the amperage or capacity of the fuse interposed between the contact plates 28 and 29 may be measured.

I have also provided the sockets or connections 15 and 16 which connect through the short branch conductors $i$ and $j$ with the respective ends of the shunt-plate 41. The measurement of any current within the limit of the shunt-plate and the ammeter may conveniently be made by direct connection of opposite ends of the circuit to be tested so as to complete and close the circuit to be tested through the posts 15 and 16. This connection is particularly useful in ascertaining whether the lighting circuit is using the proper amount or too much current, and whether the generator is operating up to its rated efficiency. The consumption of electricity by the primary circuit of a vibrating coil may also be measured by connecting the low potential poles of the coil respectively with the main battery socket 27 and the socket 15.

For measuring the consumption of one or more light bulbs independently of the circuits in which they are employed, and also for securing a circuit of a known capacity for the regulated discharge of the storage battery, which is sometimes desirable, I provide the parallel stub conductors $m$ and $m'$ connecting with the switch 38 by means of the conductor $n$ and from the switch 38 to the conductor $e$ by means of the conductor $n'$, and also the parallel stub conductors $o$ and $o'$ both of which connect with the conductor $d$ through the conductor $p$. A suitable number, I have shown four, lamp sockets $40^a$ are interposed between and connected with the conductor $m$ and the conductor $o$, and an equal number of lamp sockets $40^b$ also are interposed between and connected with the branch conductors $m'$ and $o'$. It will now be seen that by closing switch 38 a circuit will be closed through any of the sockets $40^a$ or $40^b$ which may contain bulbs and the ammeter 11, and that the amperage of a light bulb inserted in any of the sockets will show on the ammeter. The amperage of lamp bulbs being fairly dependable a current of an amperage of any multiple of the amperage of a single light bulb may be obtained by inserting the requisite number of light bulbs in the sockets $40^a$ and $40^b$.

For the purpose of testing the efficiency of spark plugs independently of the ignition circuit in the car, I have provided an induction or vibrating coil 42, the primary winding of which may conveniently be connected through the circuit breaking arm 44 to the pole 43, and by means of the conductor $q$ which connects through the conductor $a$ with the main battery socket 27, and the other primary pole 45 of which is connected by means of the conductor $r$ with the first socket 22 of the fourth series of sockets. The second socket 23 of the fourth series of sockets is connected through the branch conductor $r'$ with the conductor $c$ through which it closes the circuit through the main battery socket 26. One of the high potential posts 46 of the coil is connected through the conductor $s$ with the third socket 24 of the fourth series of sockets, and the high potential circuit is closed by connection with the other high potential post 47 of the coil through the conductor $s'$, and the conductors $a$ and $d$ and short conductor $s^2$ to the fourth socket 25. When the central sparking element of a plug is connecting with socket 24 by suitable wiring and the primary coil of the battery is closed by bridging sockets 22 and 23 the induced high potential current will cause a sparking of the plug upon contacting the casing thereof with socket 25.

I have already indicated the connections to be made for testing suspected shorts and suspected faulty insulation with the current as the same is obtained from the storage battery or other primary source of current, but it is sometimes desirable in testing heavy insulation, such as battery cell walls and distributer walls, to use a high potential current in which case leads are taken from posts 24 and 25 to the sides of the suspected insulation so that this insulation will be subjected to the potential or E. M. F. of the high potential currents. When this test is being made, I close the primary circuit of coil 42 through the switch 36 by the conductors $t$ and $t'$ leading, respectively, from opposite sides of the switch to sockets 22 and 23, respectively.

It is sometimes found that the proper intensity of spark is not being secured even when the primary winding of the coil is apparently all right and consuming no more current than it should. In order to test the capacity of a sparking coil to deliver a spark of the size for which it is rated independently of the circuit breaking instrumentalities of the automobile, I have mounted upon the instrument-board, as heretofore described, a suitable insulating base 30, posts 31 and 32 which are transversely bored for the reception of the rods 33 and 34, the points of which may be adjusted with relation to each other so as to provide a gap of the dimensions called for in the rating of the coil under test.

The primary poles 48 and $48^a$ of the coil X to be tested are then connected with leads $v$ and $v'$ running from sockets 19 and 20, respectively. Socket 19 is connected by conductor $v^2$ with conductor $b$ and thence to battery socket 26. Socket 20 is connected through switch 37 by conductors $w$ and $w'$ with conductor $r$ and then through the primary of coil 42 to battery socket 27. The high potential secondary pole 49 of the coil under test is then connected by means of the lead $x$ with the post 32 carrying the sparking point 34, and the high potential post 50 is connected by the lead $x'$ with the socket 21 which is connected through the circuit interrupter 44 by means of the conductors $y$ and $y'$ with the post 31 of the sparking point 33. The reason for connecting circuits of the coil under test with the poles for the sparking gap through the circuit interrupter of the coil 42 is to reproduce as far as possible the conditions present in the automobile circuit which are produced by the interruption of the current by the timing and distributing device.

What I claim is:—

1. A circuit for a testing instrument for the elements of electric systems for automobiles comprising a battery connection, a conductor branching therefrom to separate indicator elements, pairs of sockets, conductors leading from a member of each pair of sockets to said respective indicator elements, and a branched conductor, the branches whereof lead from the other member of each pair of sockets to a second battery connection whereby each of said circuits may be closed by connections between said pairs of sockets.

2. A testing instrument for the elements of electric systems for automobiles comprising a main battery connection, a branched conductor leading from said main battery connection to and connecting with separate indicating elements, pairs of terminal connectors, conductors leading from said indicating elements to members of said pairs of terminal connectors, a branched conductor the branches whereof lead from the opposite members of said pairs of terminal connectors to a second main battery connection whereby connections are made through said pairs of terminal connectors for including the elements to be tested within the circuits of said indicating elements.

3. An instrument for testing the elements of electric systems for automobiles comprising an induction coil, an ammeter, a buzzer, spaced contact plates, adjustable sparking points, and a group of lamp sockets connected in multiple arc, a main battery connection, a branched conductor leading therefrom to poles of the aforementioned elements, conductors leading from the opposite poles of said aforementioned elements to separate terminal connectors, terminal connectors pairing with said last mentioned terminal connectors, and a branched conductor the branches whereof lead from said last mentioned terminal connectors to a second main battery connection.

4. An instrument for testing the elements of electrical systems for automobiles comprising electrical testing devices, a main battery connection, a conductor leading from said main battery connection and branching, respectively, to a pole of each of said electrical testing devices, a second main battery connection, a series of socket connectors, a conductor leading from the second main battery connection and branching to certain of said socket connectors, and conductors leading from the poles of said electrical testing devices to other of said socket connections whereby circuits including said electrical testing devices may be closed by leads from pairs of said socket connectors.

Signed at Chicago, county of Cook and State of Illinois, this 2nd day of May, 1919.

EDWARD G. BURESCH.

Witnesses:
FLORENCE MITCHELL,
BENJ. T. ROODHOUSE.